United States Patent
Watanabe et al.

(10) Patent No.: US 7,883,333 B2
(45) Date of Patent: Feb. 8, 2011

(54) VALVE GATE

(75) Inventors: Reiko Watanabe, Kariya (JP); Tsuyoshi Tanigaki, Nagoya (JP); Kazuhiro Kato, Kariya (JP); Takehiro Sato, Niigata (JP); Hiroshi Nakayama, Niigata (JP); Toshihiro Chihara, Niigata (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/549,791

(22) Filed: Aug. 28, 2009

(65) Prior Publication Data

US 2010/0055227 A1 Mar. 4, 2010

(30) Foreign Application Priority Data

Aug. 29, 2008 (JP) .............................. 2008-221890

(51) Int. Cl.
*B29C 45/23* (2006.01)
(52) U.S. Cl. .................................. 425/564; 264/328.15
(58) Field of Classification Search ................. 425/577, 425/547, 564; 264/328.16, 328.15
See application file for complete search history.

(56) References Cited

U.S. PATENT DOCUMENTS

2010/0007058 A1* 1/2010 Fairy ........................ 425/577

FOREIGN PATENT DOCUMENTS

| JP | 11-170308 | 6/1999 |
|----|-----------|--------|
| JP | 11-254488 | 9/1999 |
| JP | 2003-11171 | 1/2003 |

* cited by examiner

*Primary Examiner*—Tim Heitbrink
(74) *Attorney, Agent, or Firm*—Oblon, Spivak, McClelland, Maier & Neustadt, L.L.P.

(57) ABSTRACT

A valve gate of an injection valve includes a center pin whose end portion is exposed to a cavity, a valve main body accommodating the center pin, a valve tip surrounding an outer circumferential portion of the end portion of the center pin and fixed at an inner circumferential portion of the valve main body, a sleeve pin provided so as to be slidable along the center pin, a reservoir portion formed between the valve main body and the sleeve pin and accommodating a molten resin, and a heater surrounding the reservoir portion, wherein the sleeve pin is displaceable between a position where an opened state is established and a position where a closed state is established, and an end portion of the heater facing the cavity is positioned closer to the cavity than an end portion of the reservoir portion facing the cavity when the closed state is established.

10 Claims, 2 Drawing Sheets

F I G. 2
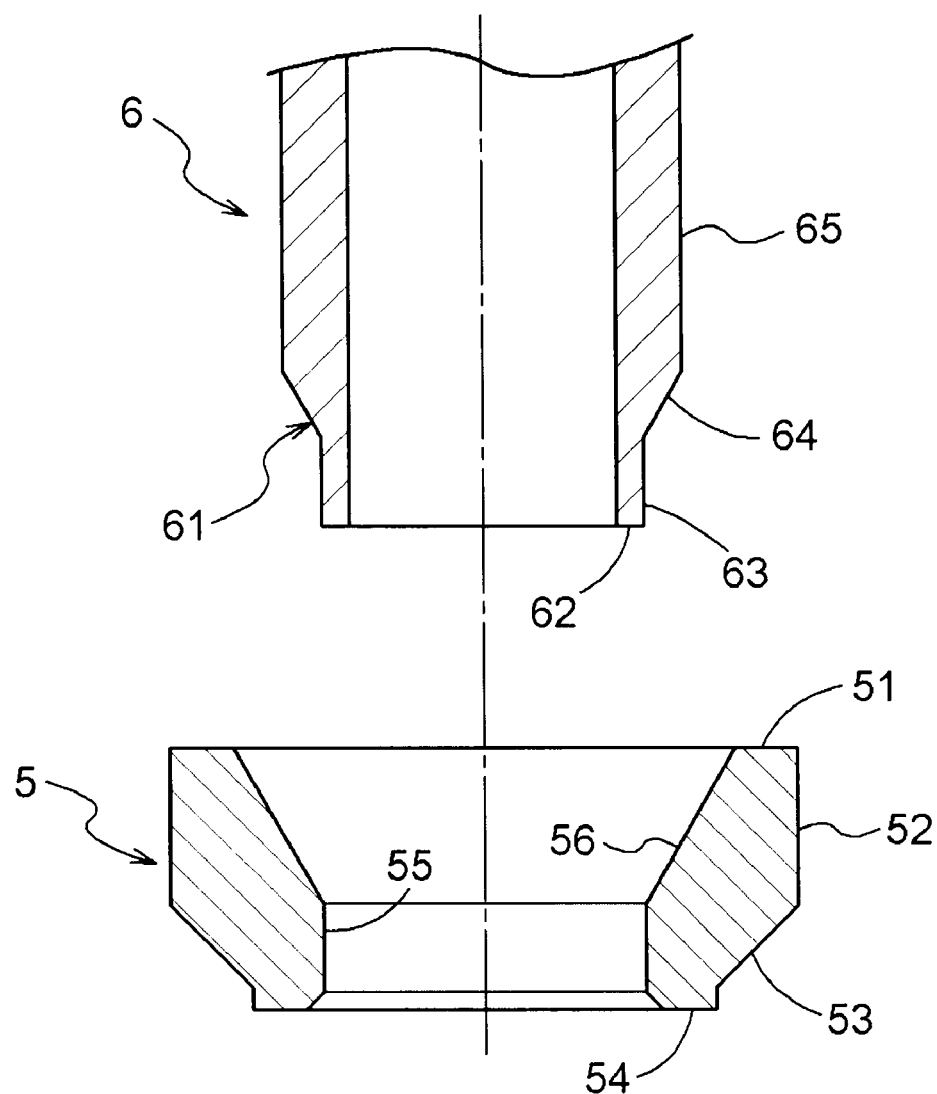

VALVE GATE

CROSS REFERENCE TO RELATED APPLICATIONS

This application is based on and claims priority under 35 U.S.C. §119 to Japanese Patent Application 2008-221890, filed on Aug. 29, 2008, the entire content of which is incorporated herein by reference.

TECHNICAL FIELD

The present invention generally relates to a valve gate for an injection valve, which is used for injecting a molten resin into a cavity.

BACKGROUND

Disclosed in JPH11-170308A is a valve gate apparatus, which is included in an injection molding machine for injecting a molten resin from an injection port thereof, including a valve for injecting the molten resin, a heater for heating the molten resin within the valve, a center core pin, and a ring gate. According to the valve gate apparatus disclosed in JPH11-170308A, the center core pin is inserted into a center portion of the valve, so that the injection port is formed between an outer circumferential surface of the center core pin and an end portion of the valve. Furthermore, the ring gate is provided at the valve gate apparatus so as to be slidable along the outer circumferential surface of the center core pin and so as to stop a flow of the resin by an outer circumferential surface of an end portion of the ring gate when the end portion of the ring gate is positioned at the injection port. Additionally, the valve gate apparatus disclosed in JPH11-170308A includes a solidified layer delamination-preventing groove portion at the outer circumferential surface of the center core pin so as to be positioned between the vicinity of the injection port and a retracted position of the ring gate.

According to the valve gate apparatus disclosed in JPH11-170308, a solidified layer in a thin film state is formed at the solidified layer delamination-preventing groove portion, which is provided so as to be away from the ring gate.

Generally, a molded object is formed by injecting a material used for a molding injection into a cavity through a hot runner and a gate, which is connected to the hot runner. On the other hand, according to an injection molding method disclosed in JP2003-11171A, an area of an injection molding apparatus corresponding to an end surface of the molded object is used as a gate, so that the material is injected into the cavity from the gate.

According to the injection molding method disclosed in JP2003-11171A, a structure of the hot runner is simplified because the area of the injection molding apparatus corresponding to the end surface of the molded object is used as the gate, so that the material is provided to the cavity through the gate.

Disclosed in JPH11-254488A is a valve gate-type mold apparatus that includes a valve casing, a heater and a valve pin. The valve casing is provided within an accommodation bore formed at a mold body and includes a material passage at an inner portion of the valve casing. The heater is provided at the valve casing. The valve pin is configured so as to open and close a gate provided within the valve casing. Furthermore, the valve gate-type mold apparatus disclosed in JPH11-254488A includes a heat insulating and sealing member, which is fitted into a clearance formed between an end portion of the valve casing and an end portion of the accommodation bore of the mold body positioned so as to correspond to the gate. The heat insulating and sealing member is configured so as to protrude towards the gate relative to the end portion of the valve casing. Furthermore, the heat insulating and sealing member includes a valve pin insertion bore so as to surround an outer circumferential surface of the valve pin.

According to the valve gate-type mold apparatus disclosed in JPH11-254488A, the clearance formed between the end portion of the valve casing and the end portion of the accommodation bore of the mold body positioned so as to correspond to the gate is filled with the heat insulating and sealing member. Accordingly, an amount of a material accumulated within the clearance may be reduced.

However, a clearance (e.g. a space), within which the molten resin is accumulated, may be formed at the heater so as to extend from an end portion of the heater positioned closer to the cavity in a case where the injection port is closed. For example, the solidified layer delamination-preventing groove portion corresponds to such clearance. Therefore, the molten resin may be accumulated within the clearance, and the accumulated resin may be solidified or may be deteriorated because the accumulated resin is exposed to a low temperature than an appropriate temperature in order to maintain a molten state of the material for a long period of time. Accordingly, the deteriorated resin or the solidified resin may be mixed into the molten resin when being injected next time, which may result in deteriorating molding accuracy in shape, external appearance, weight and the like.

Furthermore, according to the valve gate-type mold apparatus disclosed in JPH11-254488A, the heater is provided so as to be away from the gate and further, the heat insulating and sealing material is provided between the heater and the gate. Accordingly, heat generated by the heater is less likely to be transmitted to the gate. Furthermore, a temperature of the molten resin may be extracted by the mold body when the molten resin passes through the gate.

A need thus exists to provide a valve gate for an injection valve which is not susceptible to the drawback mentioned above.

SUMMARY OF THE INVENTION

According to an aspect of the present invention, a valve gate adapted to an injection valve for injecting an molten resin into a cavity formed within a mold, the valve gate includes a center pin fixed within the injection valve in a state where an end portion of the center pin is exposed to the cavity, a valve main body for accommodating the center pin, a valve tip surrounding an outer circumferential portion of the end portion of the center pin and fixed at an inner circumferential portion of the valve main body at a portion thereof positioned closer to the cavity, a sleeve pin provided at the outer circumferential portion of the center pin so as to be slidable along the center pin, a reservoir portion formed between the valve main body and the sleeve pin and accommodating the molten resin, and a heater provided at an outer circumferential portion of the reservoir portion, wherein the sleeve pin is displaceable between a position where an opened state is established and a position where a closed state is established, the opened state is a state where an end portion of the sleeve pin is detached from the valve tip and the reservoir portion and the cavity are connected with each other so as to establish a communication therebetween, and the closed state is a state where the end portion of the sleeve pin contacts the valve tip and the communication between the reservoir portion and the cavity is interrupted, and an end portion of the heater facing the cavity is positioned closer to the cavity than an end portion of the reservoir portion facing the cavity in a case where the sleeve pin is in the closed state.

BRIEF DESCRIPTION OF THE DRAWINGS

The foregoing and additional features and characteristics of the present invention will become more apparent from the following detailed description considered with the reference to the accompanying drawings, wherein:

FIG. 2 is a cross-sectional diagram of a sleeve pin and a valve tip.

DETAILED DESCRIPTION

An embodiment of a valve gate will be described below in accordance with the attached drawings.

<Overview>

Figure 1A:
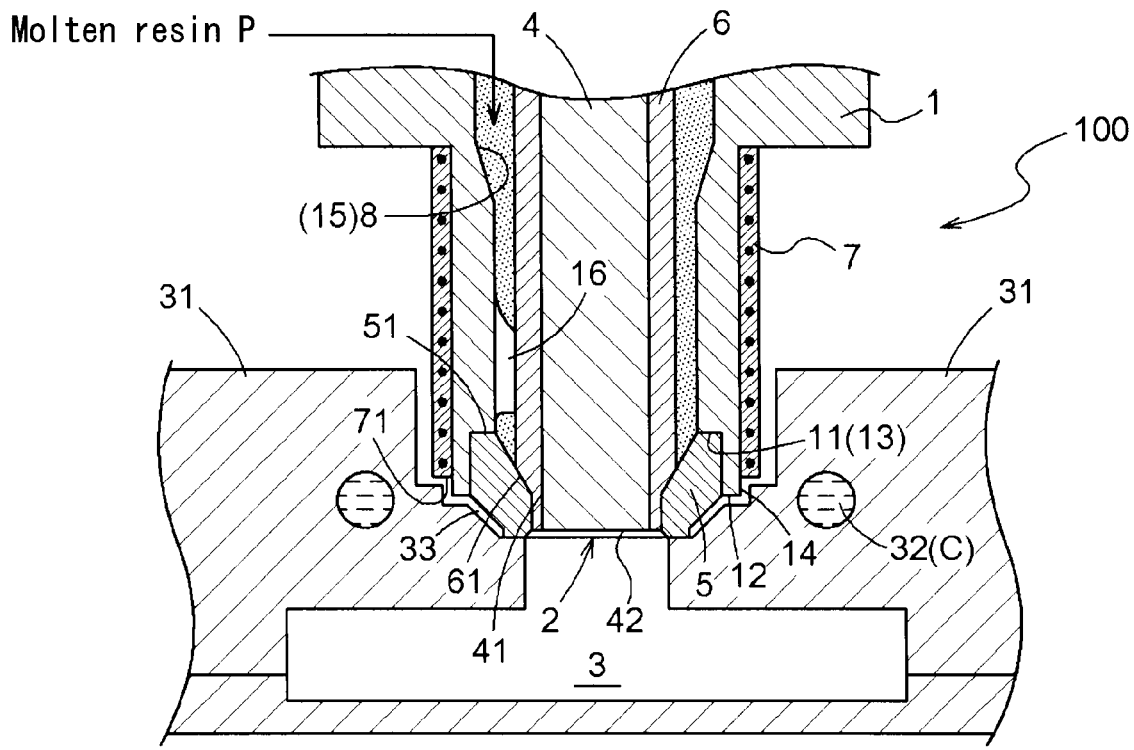
FIG. 1A is a cross-sectional diagram illustrating a valve in a case where the valve is in a closed state.
Figure 1B:
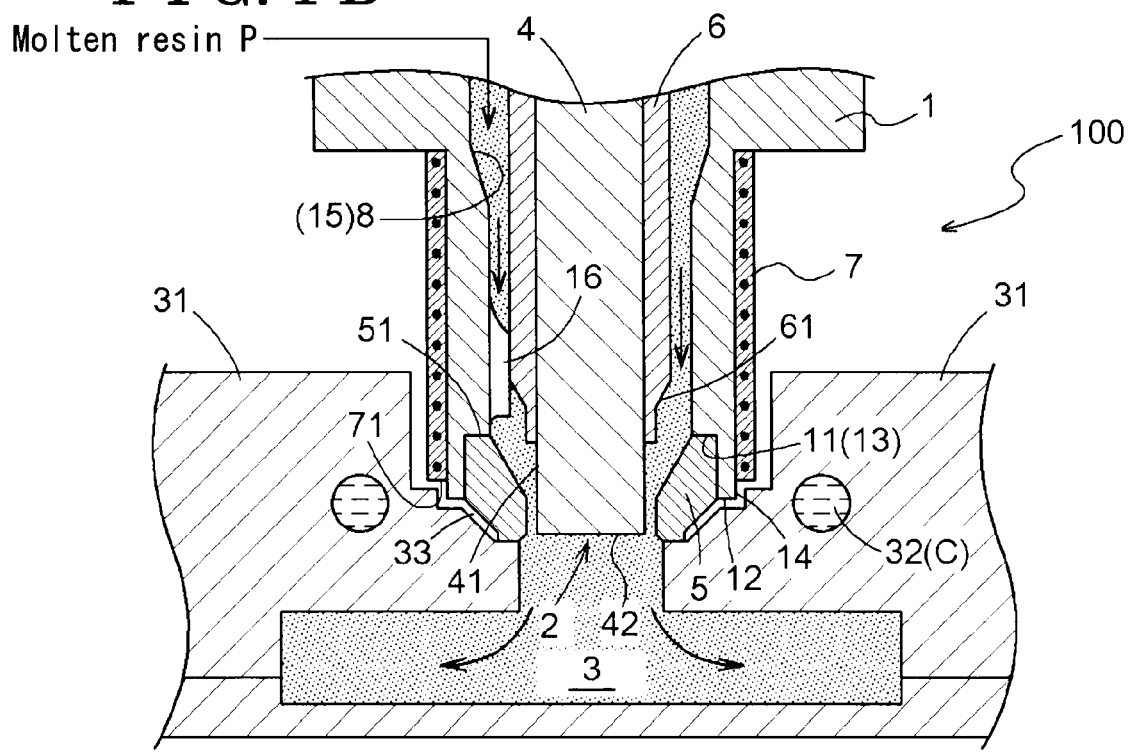
FIG. 1B is a cross-sectional diagram illustrating the valve in a case where the valve is in an opened state.

As illustrated in FIGS. 1A and 1B, a valve gate 2 of an injection valve 100 includes a valve main body 1, a center pin 4, a valve tip 5, a sleeve pin 6 and a heater 7. The valve main body 1 is formed in a cylindrical shape so that a hollow portion 15 is formed within the valve main body 1. The center pin 4 formed in a column shape is inserted into and fixed within the hollow portion 15 of the valve main body 1. The sleeve pin 6 is formed in a cylindrical shape. Furthermore, the sleeve pin 6 is provided at an outer circumferential surface of the center pin 4 so as to be slidable along the center pin 4. The valve tip 5 is formed in a circular shape. Furthermore, the valve tip 5 is fixed at an inner circumferential portion 11 of the valve main body 1 at a position in the vicinity of a cavity 3 so as to surround an outer circumferential portion 41 of an end portion 42 of the center pin 4.

A clearance (a space) formed between the valve main body 1 and the sleeve pin 6 serves as a reservoir portion 8 for storing therein a molten resin P. The heater 7, which heats the molten resin P within the reservoir portion 8, is formed in a cylindrical shape, so that the heater 7 is provided at an outer circumferential portion 14 of the valve main body 1 so as to surround the reservoir portion 8.

The sleeve pin 6 is configured so as to be displaceable between a position where an opened state (a valve opened state) is established and a position where a closed state (a valve closed state) is established. The opened state refers to a state where an end portion 61 of the sleeve pin 6 is detached from the valve tip 5, so that a communication between the reservoir portion 8 and the cavity 3 is established. On the other hand, the closed state refers to a state where the end portion 61 of the sleeve pin 6 contacts the valve tip 5, so that the communication between the reservoir portion 8 and the cavity 3 is interrupted.

As illustrated in FIGS. 1A and 1B, a fin 16 is provided at an inner circumferential surface of the valve main body 1. In this embodiment, three fins 16 are provided at the inner circumferential surface of the valve main body 1 at regular intervals (i.e. so as to form an angle of 120 degrees between the neighboring fins 16 in a circumferential direction of the valve main body 1). Additionally, any desired number of fins 16 may be provided at the inner circumferential surface of the valve main body 1. Three fins 16 are provided at the inner circumferential surface of the valve main body 1 in order to support the sleeve pin 6 and the center pin 4, i.e. in order to prevent axes of the sleep pin 6 and the center pin 4 from being largely inclined. Furthermore, each of three fins 16 is formed in a bar shape whose cross-sectional shape is formed in a substantially triangle shape.

<Configuration of Valve Tip>

As illustrated in FIGS. 1A and 1B, the valve tip 5 is formed so that a portion thereof protrude towards the cavity 3 relative to an end surface 12 of the end portion of the valve main body 1 facing the cavity 3. Furthermore, the valve tip 5 is fixed at the inner circumferential portion 11 of the valve main body 1 so that the protruding portion of the valve tip 5 is exposed towards the cavity 3, accordingly, the protruding portion of the valve tip 5 serves as an end portion of the injection valve 100 facing the cavity 3. More specifically, as illustrated in FIG. 2, the valve tip 5 is formed in a protruding shape so as to protrude towards the cavity 3. On the other hand, a portion of the valve tip 5 facing opposite to the cavity 3 is formed in a recessed shape. Furthermore, the valve tip 5 includes an upper end surface 51, an outer circumferential surface 52, an outer end circumferential surface 53, a bottom end surface 54, an inner circumferential surface 55 and a tapered surface 56.

A cut-out portion 13 is formed at the inner circumferential portion 11 of the valve main body 1 at a position close to the cavity 3. Furthermore, the cut-out portion 13 is formed so as to correspond to a shape of the upper end surface 51 and the outer circumferential surface 52 of the valve tip 5. The valve tip 5 is supported by the valve main body 1 in a manner where the upper end surface 51 and the outer circumferential surface 52 of the valve tip 5 contacts the cut-out portion 13, so that the heat of the heater 7 is conducted to the valve tip 5.

<Configuration of Cavity>

As illustrated in FIGS. 1A and 1B, the cavity 3 is a space defining a shape of the molded object to be formed. Furthermore, the cavity 3 is defined by plural molds 31. A cooling channel 32 is formed within the molds 32 so that water C (cooling water C) flows through the cooling channel 32. A temperature of the molds 31 is decreased when the cooling water C flows through the cooling channel 32. As a result, the molten resin P, which is injected into the cavity 3, is cooled down and solidified appropriately.

The injection valve 100, the valve tip 5 and the molds 31 are assembled so that the injection valve 100 is fixed at the molds 31 in a manner where the bottom end surface 54 of the valve tip 5, which serves as the end portion of the injection valve 100 facing the cavity 3, contacts the molds 31. On the other hand, the injection valve, the valve tip 5 and the molds 31 are assembled so that the outer circumferential surface 14 of the valve main body 1 does not contact the molds 31, thereby avoiding the valve main body 1 and the valve tip 5 from being cooled down by the molds 31 in the case where the molds 31 are cooled down by the cooling water C. If the valve main body 1 and the valve tip 5 are cooled down, the molten resin P may also be cooled. As a result, the molten resin P may not be properly injected into the cavity 3.

However, the arrangement of the valve tip 5 and the molds 31 is not limited to the above-described arrangement. For example, the injection valve 100, the valve tip 5 and the molds 31 may be assembled so that the outer circumferential portion 14 of the valve main body 1 slightly contacts the molds 31. Even in the case where the outer circumferential portion 14 slightly contacts the molds 31, heat conduction may be restricted (limited) as long as a contact area between the outer circumferential portion 14 of the valve main body 1 and the molds 31 is maintained to be small. Accordingly, even in the case where the injection valve 100, the valve tip 5 and the molds 31 are arranged so that the outer circumferential portion 14 of the valve main body 1 slightly contacts the molds 31, advantages and effects achieved in the case where the injection valve 100, the valve tip 5 and the molds 31 are arranged so that the outer circumferential portion 14 of the valve main body 1 does not contact the molds 31, may be achieved.

A recessed portion is formed at the molds 31 so as to correspond to a shape of the end portion of the injection valve 100. More specifically, the shape of the recessed portion formed at the molds 31 is determined so that the molds 31 do not contact the end surface 12 of the valve main body 1 and the outer end circumferential surface 53 of the valve tip 5. Accordingly, a clearance 33 is formed between the end surface 12 of the valve main body 1 and the outer end circumferential surface 53 of the valve tip 5 on the one hand and the molds 31 on the other. The clearance 33 serves as a heat insulating space, so that the valve main body 1 and the valve tip 5 are further avoided from being cooled down by the molds 31 when the molds 31 are cooled down by the cooling water C. As a result, even in the case where the sleeve pin 6 is turned to be in the opened state, the molten resin P is maintained in an appropriate molten state until just before the molten resin P is injected into the cavity 3 through a clearance formed between the center pin 4 and the valve tip 5.

<Configuration of Sleeve Pin>

The end portion 61 of the sleeve pin 6 is formed in a protruding shape so as to correspond to the recessed shape of the valve tip 5, so that the communication between the reservoir portion 8 and the cavity 3 is interrupted in the case where the sleeve pin 6 is turned to be in the closed state. More specifically, as illustrated in FIG. 2, the end portion 61 of the sleeve pin 6 includes an end surface 62, a minor diametrical outer circumferential surface 63, whose outer diameter is smaller than an outer diameter of a major diametrical outer circumferential surface 65 of the sleeve piston 6 other than the end portion 61 thereof, and a tapered surface 64. In the case where the sleeve pin 6 is turned to be in the closed state, the minor diametrical outer circumferential surface 63 and the tapered surface 64 of the sleeve pin 6 contact or substantially contact the inner circumferential surface 55 and a portion of the tapered surface 56 of the valve tip 5, respectively. Accordingly, in the case where the sleeve pin 6 is turned to be in the closed state, an end portion of the tapered surface 64 of the sleeve pin 6 positioned away from the cavity 3 (i.e. the end portion of the tapered surface 64 of the sleeve pin 6 connected to the major outer diametrical circumferential surface 65 of the sleeve pin 6) serves as an end portion of the reservoir portion 8 positioned in the vicinity of the cavity 3.

<Configuration of Center Pin>

As illustrated in FIGS. 1A and 1B, the center pin 4 is inserted into and fixed at the hollow portion of the valve main body 1 so as to be coaxial with the valve tip 5.

<Configuration of Heater>

As illustrated in FIGS. 1A and 1B, the heater 7 is formed in the cylindrical shape so as to be supported and surround the outer circumferential portion 14 of the valve main body 1, so that the heater 7 normally heats the molten resin P stored within the reservoir portion 8. The heater 7 is provided at the valve main body 1 so that an end portion of the heater 7 facing the cavity 3 is positioned closer to the cavity 3 relative to the end portion of the tapered surface 64 of the sleeve pin 6 positioned away from the cavity 3 (i.e. the end portion of the tapered surface 64 of the sleeve pin 6 connected to the major diametrical outer circumferential surface 65 of the sleeve pin 6). Furthermore, a thickness of a portion of the valve main body 1, to which the valve tip 5 is provided, in a radial direction thereof is formed to be thinner than a thickness of the valve tip 5 in a radial direction thereof. Accordingly, a distance between the valve tip 5 and the heater 7 is set to be relatively closer than a distance between the reservoir portion 8 and the heater 7.

According to the embodiment, in the case where the sleeve pin 6 is turned to be in the closed state, the clearance for storing the molten resin P is not extended towards the cavity 3 farther than the end portion 71 of the heater 7. In other words, the clearance for storing the molten resin P is formed so as to correspond to the heater 7 in the case where the sleeve pin 6 is maintained in the closed state. Accordingly, chances of the molten resin P deteriorating or being solidified while the molten resin P is accumulated within the clearance (e.g. reservoir portion 8) may be reduced. As a result, chances of the deteriorated resin or the solidified resin being mixed with the molten resin P when being injected into the cavity 3 subsequently may be reduced. Furthermore, the molten resin P stored within the reservoir portion 8 is heated by the heater 7 so that the molten resin P is maintained in the appropriate molten state. Accordingly, the molded object having relatively high molding accuracy may be obtained. More specifically, the molded object having an accurate shape (e.g. a targeted external appearance), accuracy in size, appropriate strength, accuracy in weight and the like may be obtained. Furthermore, because the solidified resin is less likely to be generated, the communication between the reservoir portion 8 and the cavity 3 is less likely to be interrupted by the solidified resin. Accordingly, the injection of the molten resin P into the cavity 3 is stably performed.

Furthermore, because the clearance for storing some of the molten resin P injected previously is less likely to be formed at the injection valve 100 so as to be positioned closer to the cavity 3 than the end portion 71 of the heater 7, operating efficiency of removal of the resin in a case where the resin is changed to a difference type of resin, in a case where a color of the resin is changed to a different color, or the like may be improved. In other words, the resin is easily removed from the injection valve 100.

According to the embodiment, because the heater 7 is provided so as to be supported and surround the outer circumferential portion 14 of the valve main body 1, the molten resin P is evenly and effectively heated by the heater 7. Accordingly, the molten resin P is maintained in the appropriate molten state. As a result, the molten resin P is smoothly injected.

Furthermore, because the heater 7 is positioned in the vicinity of the valve tip 5, the molten resin P is surely heated until just before the molten resin P is injected into the cavity 3 through the clearance formed between the center pin 4 and the valve tip 5. Furthermore, because the outer circumferential portion 14 of the valve main body 1 does not contact the molds 31, the heat of the heater 7 is not likely to be conducted to the molds 31. Accordingly, the molten resin P stored within the reservoir portion 8 is maintained in the appropriate molten state. As a result, the molten resin P is smoothly injected into the cavity 3, so that the molded object having relatively high accuracy may be obtained.

As described above, even in the case where the injection valve 100, the valve tip 5 and the molds 31 are arranged so that the outer circumferential portion 14 of the valve main body 1 slightly contacts the molds 31, the heat of the heater 7 is less likely to be conducted to the molds 31. Accordingly, the molten resin P stored within the reservoir portion 8 is maintained in the appropriate molten state. As a result, the molten resin P is smoothly injected into the cavity 3, so that the molded object having relatively high accuracy may be obtained.

A material having relatively high thermal conductivity may be used for the valve tip 5. In this case, because heat dissipation at the valve tip 5 is prevented, the molten resin P is further surely and properly heated.

The shape of the heater 7 is not limited to have the cylindrical shape for surrounding the outer circumferential portion 14 of the valve main body 1. For example, the shape of the heater 7 may be modified as long as the heater 7 is provided so that the end portion 71 thereof is positioned closer to the cavity 3 relative to the end portion of the reservoir portion 8 positioned closer to the cavity 3, as long as the heater 7 is provided in the vicinity of the valve tip 5, and further, as long as the molten resin P and the valve tip 5 are surely heated.

The heater 7 may be provided at an inner portion of the center pin 4. Even in this case, the molten resin P is surely and properly heated. Furthermore, in this case, chances of the molten resin P being solidified at the outer circumferential portion 41 of the center pin 4 may be reduced.

<Closed State>

As described above, in the case where the minor diametrical outer circumferential surface 63 and the tapered surface 64 of the sleeve pin 6 contact or substantially contact the inner circumferential surface 55 and a portion of the tapered surface 56 of the valve tip 5, respectively, the communication between the reservoir portion 8 and the cavity 3 is interrupted. Accordingly, the closed state is established. Therefore, the molten resin P is stopped at the tapered surface 56 of the valve tip 5, which serves as the end portion of the reservoir portion 8, so that the molten resin P is not allowed to flow towards the cavity 3. In this case, the molten resin P stored within the reservoir portion 8, even the molten resin P existing at the end portion of the reservoir portion 8, is surely and properly heated by the heater 7, so that the molten resin P is maintained in the appropriate molten state. Accordingly, the solidified resin, the deteriorated resin and the like are less likely to be generated.

<Opened State>

In the case where the tapered surface 64 of the sleeve pin 6 is detached (disengaged) from the tapered surface 56 of the valve tip 5 and the end surface 62 of the sleeve pin 6 is displaced in a direction opposite to the cavity 3 relative to the inner circumferential surface 55 of the valve tip 5, a clearance formed between the reservoir portion 8, the tapered surface 56 of the valve tip 5 and the miner diametrical outer circumferential surface 63 and the tapered surface 64 of the sleeve pin 6, the clearance formed between the inner circumferential surface 55 of the valve tip 5, the outer circumferential portion 41 of the center pin 4 and the end surface 62 of the sleeve pin 6, and the cavity 3 are connected with each other so that a communication is established therebetween. As a result, the molten resin P stored within the reservoir portion 8 is allowed to flow towards the cavity 3. In this case, because the valve tip 5 is surely and properly heated by the heater 7, the molten resin P is maintained in the appropriate molten state until the molten resin P is injected into the cavity 3. Accordingly, the molten resin P is smoothly injected into the cavity 3.

Accordingly, in the case where the sleeve pin 6 is in the closed state, the clearance for sorting the molten resin P is not extended (formed) towards the cavity 3 than the end portion of the heater 7 facing the cavity 3. Therefore, the molten resin P, may not be deteriorated or solidified while the molten resin P is accumulated, so that the deteriorated resin, the solidified resin and the like may not be mixed with the molten resin P in the case where the molten resin P is injected subsequently. As a result, the molded object having the accurate shape (e.g. the targeted external appearance), accuracy in size, appropriate strength, accuracy in weight and the like may be obtained.

Furthermore, because the communication between the reservoir portion 8 and the cavity 3 is less likely to be interrupted by the solidified resin, the molten resin P is stably injected.

Accordingly, in the case where the sleeve pin 6 is in the closed state, the molten resin P stored at the end portion of the reservoir portion 8 positioned closer to the cavity 3 is surely and properly heated by the heater 7. As a result, the molten resin P is maintained in the appropriate molten state. Therefore, in the case where the sleeve pin 6 is turned to be in the opened state in order to inject the molten resin P subsequently, the molten resin P is smoothly injected.

Furthermore, because the clearance, within which the molten resin P injected previously is accumulated, is less likely to be formed so as to be positioned closer to the cavity 3 relative to the end portion of the heater 7 positioned in the vicinity of the cavity 3. Therefore, the operating efficiency of removal of the resin when necessary is enhanced.

According to the embodiment, the valve tip is provided so as to be exposed to the cavity 3, so that the valve tip 5 defines an end portion of the injection valve 100 facing the cavity 3. The heater 7 is provided in the vicinity of the valve tip 5.

Accordingly, the heater 7 is provided in the vicinity of the valve tip 5. In other words, the heater 7 is provided at the valve main body 1 so as to be positioned closer to the valve tip 5 in a radial direction thereof. More specifically, the heater 7 is provided at the valve main body 1 so that the distance between the valve tip 5 and the heater 7 in the radial direction is set to be smaller than the thickness of the valve tip 5 in the radial direction thereof. Therefore, the molten resin P may be heated until the molten resin P is injected into the cavity 3 through the valve tip 5. Accordingly, the molten resin P is injected into the cavity 3 while the molten resin P is maintained in the appropriate molten state. As a result, the molten resin P is smoothly injected, and further, the molding accuracy may be improved.

According to the embodiment, the heater 7 is provided so as to be supported and surround the reservoir portion 8.

Accordingly, because the heater 7 is configured so as surround the reservoir portion 8, the molten resin P is evenly heated. As a result, the molten resin P is efficiently and properly heated.

According to the embodiment, the clearance is formed at a portion of a boundary between the valve tip 5 and the molds 31.

Accordingly, the clearance is formed between the valve tip 5 and the molds 31, so that the clearance serves as the heat insulating space. As a result, chances of the valve main body 1 and the valve tip 5 being cooled down by a member for defining the cavity 3 (i.e. the molds 31) may be reduced. Therefore, the molten resin P is maintained in the appropriate molten state until the molten resin P is injected into the cavity 3 through the valve tip 5. As a result, the molten resin P is smoothly injected.

According to the embodiment, the valve main body 1 is provided to the valve gate 2 so as to be away from the molds 31.

Accordingly, because the valve main body 1 and the molds 31 are arranged so as to be away from each other, the heat of the heater 7 may not be conducted to the molds 31. As a result, the heat of the heater 7 is effectively conducted to the valve tip 5, thereby maintaining the molten resin P to be in the appropriate molten state.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A valve gate adapted to an injection valve for injecting an molten resin into a cavity formed within a mold, the valve gate comprising:
   a center pin fixed within the injection valve in a state where an end portion of the center pin is exposed to the cavity;
   a valve main body for accommodating the center pin;
   a valve tip surrounding an outer circumferential portion of the end portion of the center pin and fixed at an inner circumferential portion of the valve main body at a portion thereof positioned closer to the cavity;
   a sleeve pin provided at the outer circumferential portion of the center pin so as to be slidable along the center pin;
   a reservoir portion formed between the valve main body and the sleeve pin and accommodating the molten resin; and
   a heater provided at an outer circumferential portion of the reservoir portion, wherein
   the sleeve pin is displaceable between a position where an opened state is established and a position where a closed state is established, the opened state is a state where an end portion of the sleeve pin is detached from the valve tip such that the reservoir portion and the cavity are connected with each other via a passage defined by an outer circumferential surface of the center pin and an inner circumferential surface of the valve tip so as to establish a communication therebetween, and the closed state is a state where the end portion of the sleeve pin contacts the valve tip and the communication between the reservoir portion and the cavity is interrupted, and
   an end portion of the heater facing the cavity is positioned closer to the cavity than an end portion of the reservoir portion facing the cavity in a case where the sleeve pin is in the closed state.

2. The valve gate according to claim 1, wherein the valve tip is provided so as to be exposed to the cavity, so that the valve tip defines an end portion of the injection valve facing the cavity, and the heater is provided in the vicinity of the valve tip.

3. The valve gate according to claim 1, wherein the heater is provided so as to be supported and surround the reservoir portion.

4. The valve gate according to claim 2, wherein the heater is provided so as to be supported and surround the reservoir portion.

5. The valve gate according to claim 2, wherein a clearance is formed at a portion of a boundary between the valve tip and a mold.

6. The valve gate according to claim 3, wherein a clearance is formed at a portion of a boundary between the valve tip and a mold.

7. The valve gate according to claim 4, wherein a clearance is formed at a portion of a boundary between the valve tip and a mold.

8. The valve gate according to claim 1, wherein the valve main body is provided to the valve gate so as to be away from the mold.

9. The valve gate according to claim 1, wherein the end portion of the sleeve pin includes a minor diametrical outer circumferential surface, a major diametrical outer circumferential surface and a tapered surface therebetween,
   the valve tip includes an inner circumferential surface, an upper end surface and a tapered surface therebetween, and
   in the closed state, the tapered surface of the end portion of the sleeve pin contacts the tapered surface of the valve tip and the minor diametrical outer circumferential surface of the end portion of the sleeve pin contacts the inner circumferential surface of the valve tip.

10. The valve gate according to claim 9, wherein the end portion of the reservoir portion facing the cavity in a case where the sleeve pin is in the closed state is defined by contact between the tapered surface of the valve tip and the tapered surface of the sleeve pin.

* * * * *